United States Patent
Mitchell

(10) Patent No.: US 9,526,238 B2
(45) Date of Patent: Dec. 27, 2016

(54) CHEMICAL DELIVERY SYSTEM FOR CONTROLLING BEETLE POPULATIONS IN A POULTRY HOUSE

(71) Applicant: Edgar Lyle Mitchell, Cleveland, GA (US)

(72) Inventor: Edgar Lyle Mitchell, Cleveland, GA (US)

( * ) Notice: Subject to any disclaimer, the term of this patent is extended or adjusted under 35 U.S.C. 154(b) by 180 days.

(21) Appl. No.: 14/546,431

(22) Filed: Nov. 18, 2014

(65) Prior Publication Data

US 2015/0164062 A1 Jun. 18, 2015

Related U.S. Application Data

(60) Provisional application No. 61/905,558, filed on Nov. 18, 2013.

(51) Int. Cl.
*A01M 1/20* (2006.01)
*A01M 1/24* (2006.01)
*A01K 13/00* (2006.01)

(52) U.S. Cl.
CPC ............ *A01M 1/245* (2013.01); *A01K 13/003* (2013.01); *Y10T 137/6969* (2015.04)

(58) Field of Classification Search
USPC ........................................ 43/132.1, 124, 107
See application file for complete search history.

(56) References Cited

U.S. PATENT DOCUMENTS

| | | | | |
|---|---|---|---|---|
| 4,866,877 | A * | 9/1989 | Barak | A01M 1/02 43/121 |
| 6,766,613 | B2 * | 7/2004 | Stevens | A01N 37/44 43/132.1 |
| 7,737,122 | B2 * | 6/2010 | Boucher, Jr. | A01N 43/22 514/28 |
| 2004/0248824 | A1 * | 12/2004 | Snyder | A01N 43/22 514/28 |
| 2009/0099135 | A1 * | 4/2009 | Enan | A01N 65/00 514/86 |
| 2014/0317996 | A1 * | 10/2014 | Li | A01N 59/04 43/127 |
| 2015/0037307 | A1 * | 2/2015 | Bralkowski | C05F 5/006 424/93.462 |

* cited by examiner

*Primary Examiner* — Christopher P Ellis
(74) *Attorney, Agent, or Firm* — Dale J. Ream

(57) ABSTRACT

A chemical delivery system for controlling virus-carrying beetles in a poultry house includes a water line in communication with a water source and chemical injector. The system includes an outer shell and bracket configured to mount the water line to a poultry house wall, the water line having a plurality of spaced apart holes such that, when the water and chemical are actuated, delivers a continuous stream of chemical onto the wall and litter bed so as to neutralize the beetles from spreading virus to poultry.

15 Claims, 7 Drawing Sheets

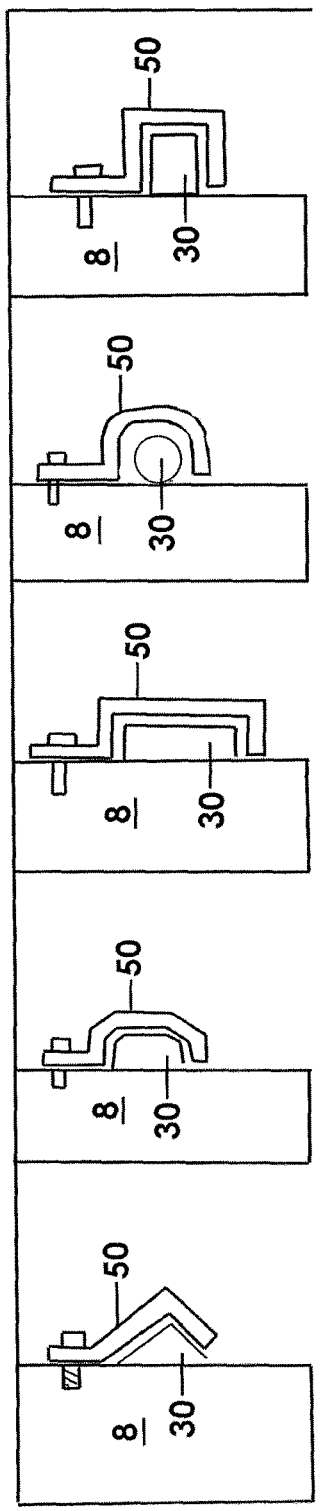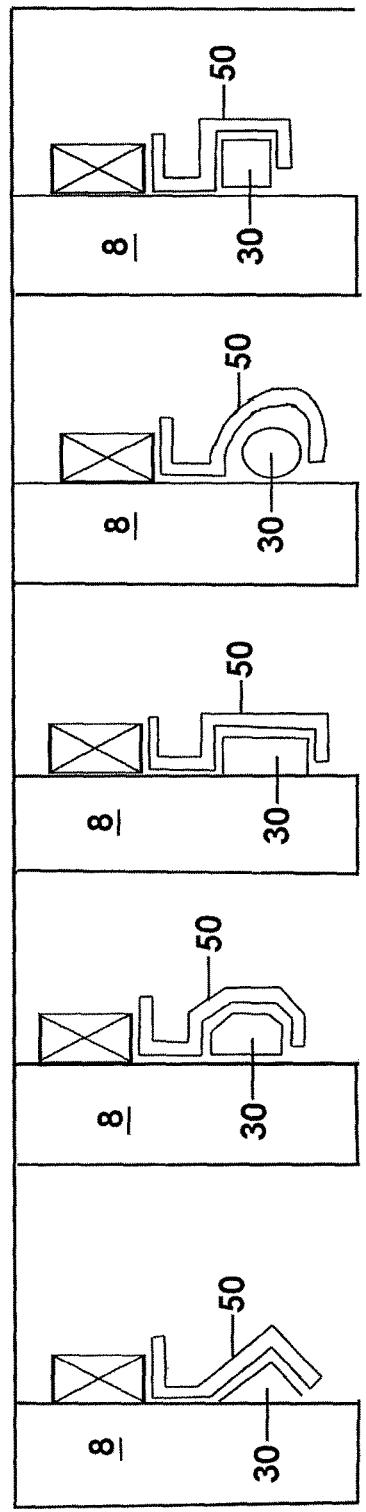
Fig. 5a
Fig. 5b

CHEMICAL DELIVERY SYSTEM FOR CONTROLLING BEETLE POPULATIONS IN A POULTRY HOUSE

REFERENCE TO RELATED APPLICATIONS

The present invention claims the benefit of U.S. Provisional Patent Application Ser. No. 61/905,558, filed on Nov. 18, 2013 titled Chemical Delivery System for Controlling Beetle Populations in a Poultry House.

BACKGROUND OF THE INVENTION

The present invention relates to insect and disease control systems and, more particularly, to a chemical delivery system that maintains a continuous chemical presence in the litter bed of a poultry house so as to decrease the population of virus carrying darkling beetles.

In the poultry industry, profit is largely dependent on the livability of the birds being raised and on maintaining efficient performance of the entire operation. Profit and loss are decided in hundredths of a penny. One well known problem with broilers is a small bug called a darkling beetle. In their natural environment they are not even noticed. Most of them live in roots of trees and plants, or just in topsoil, but in chicken houses it is far from their natural environment and their effects can be a major economic problem.

The "livability" of birds in a poultry operation refers to the degree to which the chickens are stressed, are properly nourished, and are maintained in good health. To the extent that the darkling beetles cause stress, cause the birds not to eat or drink appropriately, or become diseased, the birds fail to reach their full potential which decreases the profits of the poultry organization. This is understood better with a more detailed description of the problem. The following description is by way of example of how virus carrying beetles can affect profit.

Livability—Consider that a flock of chickens has just sold on any broiler farm, and if those birds had a disease such as REO Virus, the beetles present in a litter bed will become hosts for the REO Virus. The farmer prepares his farm for the next flock of baby chicks. The houses are set up, heated up, and then the baby chicks arrive and are placed in the houses with the infected beetles from the previous flock still in the previous flock's litter, potentially in large numbers. As soon as the starter feed is taken up from floor feeding (normally seven to twelve days old) the beetles turn to feed on anything they can, including dead birds, bird droppings, and any source of moisture.

Infecting the birds—The most common way of infecting the newly arrived birds is when the birds rest on the litter bed, the beetles bite the chicks and the birds contract the virus. Further, the infected bird drinks from the same drinker nipples that the other birds drink from, such that many more birds contract the virus as well. Once the virus spreads among the flock then the mortality rate increases greatly.

Stress—A happy bird produces a larger bird. When a birds environment is good it promotes good feed and water consumption and leads to a higher average in weight with good performance. By contrast, when the beetles continue to bite the birds, they become uncomfortable and stressed. This reduces feed and water consumption and leads to lower weight, lower performance, and lower profit to the farmer.

There are numerous negative effects of an uncontrolled darkling beetle population. First, farmers get paid based on the weight of the chickens, so low average weight and high feed conversion reduces their profit. Second, beetle populations lead to energy loss to the poultry house. Specifically, one of the preferred places for darkling beetles to lay their eggs is in the walls in the installation. In doing so, the beetles lay their eggs and eat holes in the installation; therefore, they destroy the R-Value of the installation. Third, the beetles get into everything including computer controllers and, as a result, affect their functions, sometimes shorting out the controllers. Therefore, it is almost an understatement that uncontrolled darkling beetle population can result in millions of dollars in damage and lost profits.

Currently, beetle populations are controlled by large scale chemical spraying operations. While assumedly effective for their intended purposes, a major difficulty is that the litter bed and entire interior of a poultry house can only be sprayed when empty, i.e. when all of the birds have been moved out. A flock of birds is typically kept by a farmer for six to nine weeks, depending on the size requirements of the poultry integrator. So, if a chicken house is sprayed just prior to receiving a flock, it cannot be sprayed again until after that flock is grown and moved out. The obvious problem is that the beetles have plenty of time to repopulate and cause all of the problems discussed previously.

Therefore, it would be desirable to have a chemical delivery system for controlling a beetle population in a poultry house that maintains a continuous chemical presence for the constant suppression of darkling beetle populations. Further, it would be desirable to have a chemical delivery system in which the potency of the chemical can be regulated depending on the changing environment of a poultry house.

SUMMARY OF THE INVENTION

A chemical delivery system for controlling virus-carrying beetles in a poultry house according to the present invention includes a water line in communication with a water source and chemical injector. The system includes an outer shell and bracket configured to mount the water line to a poultry house wall, the water line having a plurality of spaced apart holes such that the water line, when the water and chemical are actuated, delivers a continuous stream of chemical onto the wall and litter bed so as to neutralize the beetles from spreading virus to poultry.

Therefore, a general object of this invention is to provide a chemical delivery system that enables a beetle suppression chemical to be applied continuously to predetermined areas of a poultry litter bed.

Another object of this invention is to provide a chemical delivery system, as aforesaid, that continuously applies a chemical adjacent the walls, drinker lines, and feeder lines as these are the most common environments for darkling beetles.

Still another object of this invention is to provide a chemical delivery system, as aforesaid, in which the potency of the dispensed chemical can be regulated.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 5a is a plurality of side views of outer shells and corresponding mounting brackets illustrating various shape configurations for use in concrete mounting applications; and FIG. 5b is a plurality of side views of respective outer shells and corresponding mounting brackets illustrating various shape configurations for use in wood mounting applications.

DESCRIPTION OF THE PREFERRED EMBODIMENT

Figure 1:
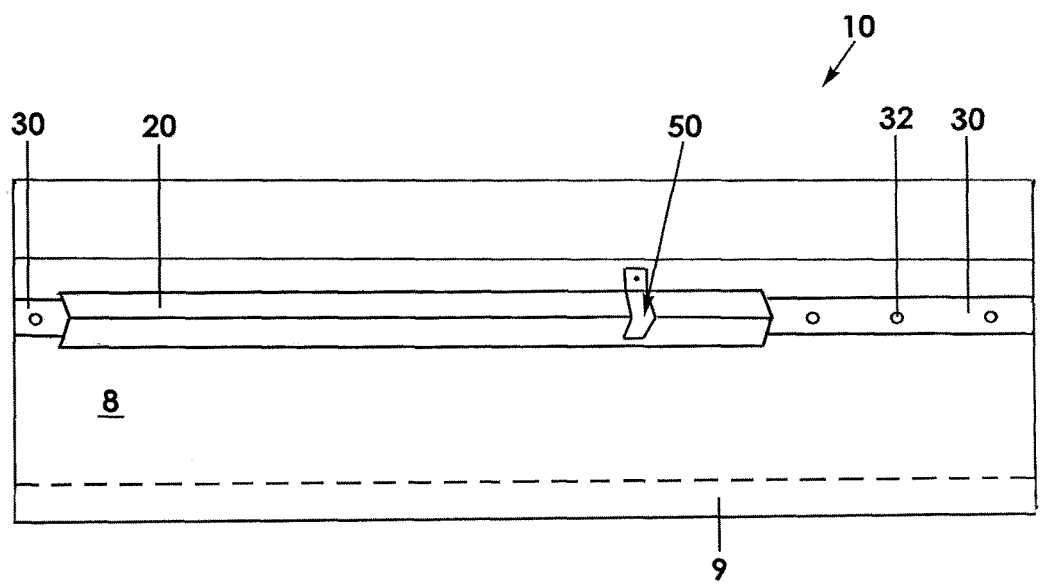
FIG. 1 is a front view of a chemical delivery system according to a preferred embodiment of the present invention.
Figure 2:
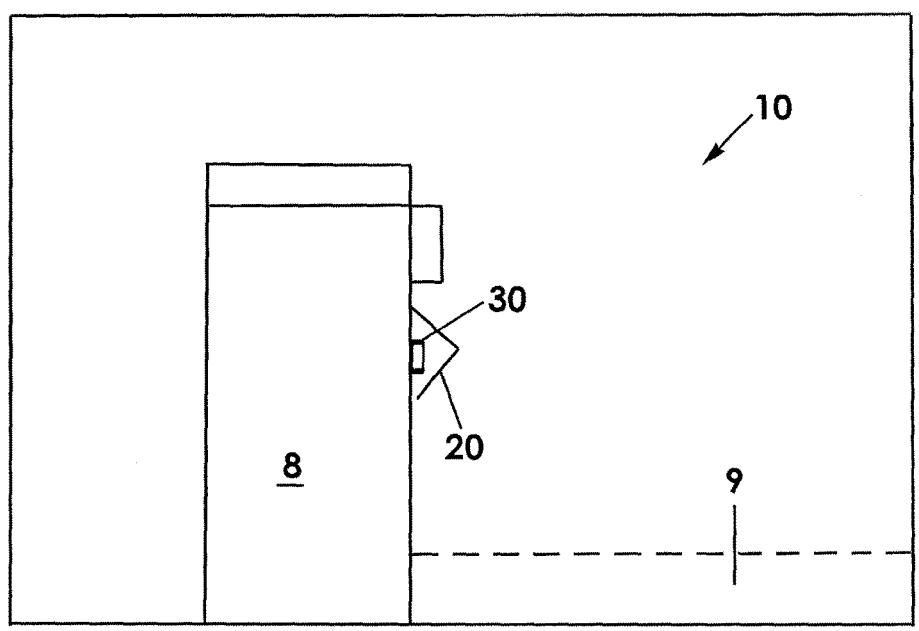
FIG. 2 is a side view of the chemical delivery system as in FIG. 1.
Figure 3:
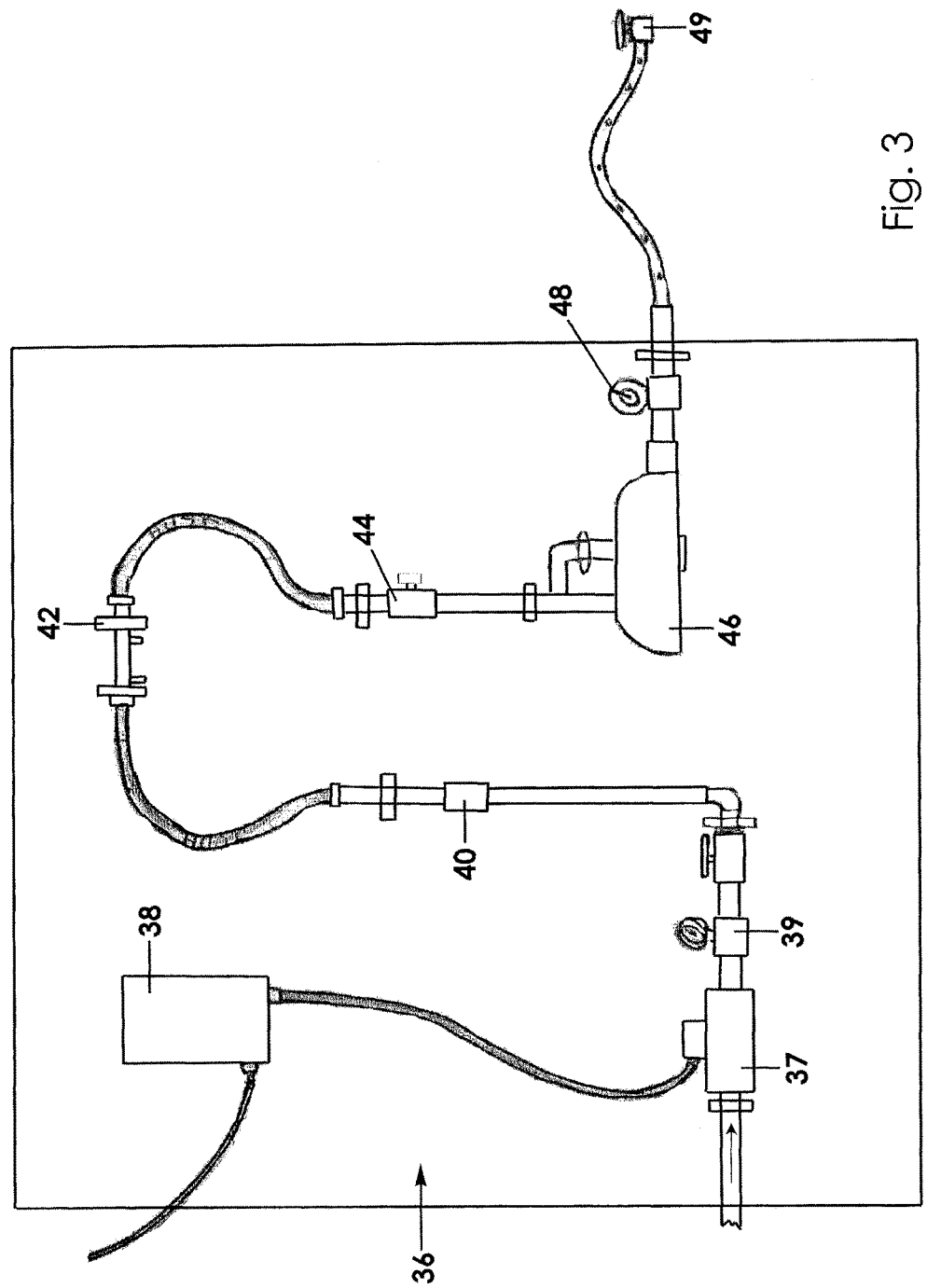
FIG. 3 is a front view of a control board of the chemical delivery system as in FIG. 1.

A chemical delivery system for controlling beetles in a poultry house according to preferred embodiments of the present invention will now be described with reference to the FIGS. 1 to 5b of the accompanying figures.

The chemical delivery system 10 includes an outer shell 20, a wall line 30, and a mounting bracket 50. The wall line 30 may be a drip line or tube that is constructed of either rigid or flexible or flat material and may be enlarged by water pressure. The wall line will also be referred to as a drip line and will use the same reference numeral. The drip line 30 may be a hard pipe with drilled hose ranging from 1/16" to 3" in diameter, a soaker hose, a drip tape, with or without emitters, low or high pressure, PVC lines, CPVC lines, roll plastic lines or flex pipe. In other words, the drip line 30 may be a tubular water line that defines a plurality of spaced apart holes 32 through which water flowing through the water line is able to exit the tubular water line. The spaced apart holes 32 are configured to allow a slow and steady release of water flowing through the drip line 30.

The drip line 30 is in fluid communication with a main water line 34 or other water source. More particularly, an adapter may connect the drip line 30 to a water source, such as city, county, community, gravity, spring, or well water. The water supply can be fed through any size pipe ranging from 1/8" to 6" pipe. Control of water received from a water source is through an apparatus referred to herein as a "control board 36."

The water supply pressure may range from 0.05 PSI to 120 PSI. Once the water supply is connected to the inflow side of control board 36, it will first go through the electric, manual, gate valve or ball valve shut off valve 37 which is a plastic or metal shut off valve. The shut off valve 37 is controlled by low or high voltage. It may be operated by a timer 38 whether by manual, digital, computer control, or manual timer low or high voltage. Next the water flows through a pressure reading valve 39 between the timed cut off valve and the first manual cut off valve. The water then flows through the pipe to a one way check valve 40 plastic or metal automatic or manual which allows the inflow of water to go one direction. The water then flows closer to the injector 42 by way of flexible or rigid pipe.

Once the water arrives at the injector 42 (such as centrifugal pumps, positive displacement pumps, pressure differential pump, or Venturi injectors, rotary pumps, injectors, downstream or upstream, dosage pumps, combination method pumps, electric or computer controlled or low or high voltage), the water is injected with a predetermined amount of a chemical. Once the desired dilution is met the diluted chemical exits the injector 42 and continues through another safety shut off valve 44. Then, the solution proceeds to the regulator 46 (a metal or plastic component—whether computer controlled, high or low voltage, manual or pressure controlled). The regulator 46 is configured to regulate the diluted chemical to pressure ranging from 0.05 PSI to 200 PSI. Now, the diluted chemical proceeds through the last pressure gauge valve 48 to the wall line.

Figure 4A:
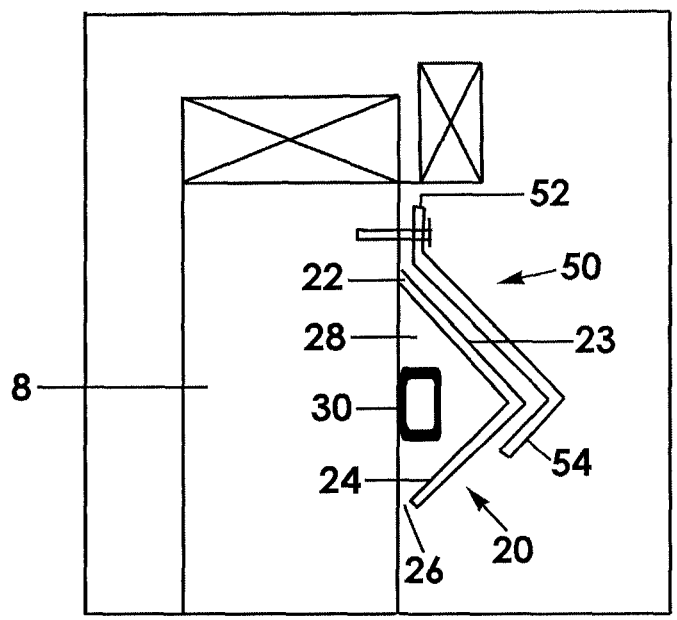
FIG. 4a is a side view on an enlarged scale of the chemical delivery system as in FIG. 2.
Figure 4B:
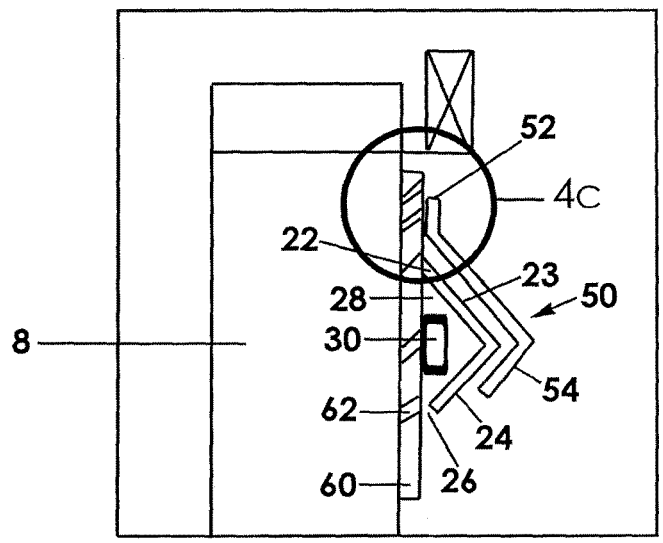
FIG. 4b is a side view of the chemical delivery system as in FIG. 4a illustrated with a wall mounting member for vertical adjustment.

The outer shell 20 is configured to shield and protect the drip line 30 when mounted to an upstanding wall 8 inside a poultry house. The outer shell 20 may be constructed of PVC, vinyl, CPVC, metal, fiberglass—extruded or molded and ranging in wall thickness (1/16" to 3/4"). In general, the outer shell 20 has an elongate configuration that extends along and about a length of the drip line 30. The outer shell 20 may include an angle shape with a leg length ranging from 1/4" to 3" in size. As shown in the figures, the drip line 30 may be mounted within an open area defined by the angle of the outer shell 20. More particularly, the outer shell 20 may include an upper edge 22 extending longitudinally that is configured to bear against a flat upstanding wall 8 of a poultry house when installed therein. Similarly, the outer shell 20 may include a lower edge 24 opposed from the upper edge 22 and extending longitudinally parallel to the upper edge 22, the lower edge 24 being configured to remain slightly displaced from the upstanding wall 8 (FIG. 4a). The displacement of the lower edge 24 defines an elongate outlet channel 26. It can be seen that water flowing out of respective holes 32 in the drip line 30 is allowed to flow downwardly from the drip line 30 and through the outlet channel 26 defined by the space between the lower edge 24 and upstanding wall 8. This is how chemically-infused water is deposited on the litter bed 9 of the poultry house. Preferably, the chemically-infused water actually contacts the wall 8 and runs down the wall 8 to the litter bed 9. In one embodiment, a skirt or wick (not shown) may form a bridge between the lower edge 24 and the wall 8 in order to effectively direct the water against the wall 8.

The outer shell 20 includes an elongate side wall 23 extending between the upper edge 22 and lower edge 24, the side wall 23 having a portion that extends outwardly away from respective edges (i.e. away from the upstanding wall 8 when positioned adjacent thereto). The side wall 23, therefore, defines an interior area 28 in which the elongate drip line 30 may be positioned (FIG. 4a).

In some embodiments, the outer shell 20 may take on various configurations as shown in FIG. 5a, such as an inverted L-shaped configuration, a C-shaped or inverted C-shaped configuration, D-shaped or inverted D-shaped configuration, generally rectangle shaped configuration, or square shaped configuration. The outer shell 20 may be coupled directly to a wall (concrete or wood) with shell anchors which will preferably match the contour of the outer shell 20. A mounting bracket 50, also referred to as a shell bracket, may be used to mount the outer shell 20 to an upstanding wall 8 made of concrete and may be configured to accommodate height adjustment as will be described in more detail later. Each mounting bracket 50 may include a configuration that is substantially similar and complementary to a configuration of a corresponding outer shell 20

(FIG. 5a). It is understood that mounting brackets may be similarly configured for mounting to wood (FIG. 5b). The outer shell 20 may include a plurality of mounting brackets 50 spaced apart therealong and configured to support the outer shell 20.

Each mounting bracket 50 may include a first portion 52 selectively coupled to an upstanding wall 8 of the poultry house and a second portion 52 having a configuration that is complementary or generally congruent to a configuration of a corresponding outer shell 20 and configured to support the outer shell 20 relative to the upstanding wall 8. More particularly, the second portion 52 of each mounting bracket 50 is configured to be adjacent a lower section of a respective side wall 8 of an outer shell 20 so as to support the weight of the outer shell 20 against the upstanding wall 8.

The mounting bracket 50 may be constructed of metal, PVC, CPVC, vinyl or fiberglass. In some embodiments, the mounting bracket 50 may not match the contour of the outer shell 20 but by mounting to it by a single tap of a screw or rivet then to the wall 8 by a screw or nail made of plastic or metal. At the end of the wall line, there may be a flush out component such as a flush valve 49 or gate valve automatic or manual control. In one embodiment, the wall line may be a single line (not an inner and outer line). In those cases the wall line will be shaped in a shallow C, D shape, a rectangle shape, a circle shape, or a square shape. When this wall line is used the anchor brackets will substantially match the shape or with a single tap bracket.

Poultry houses are getting larger as construction techniques evolve to allow for longer and wider houses. Therefore in some embodiments of the present system, it may require more than one control board 36 or a modified control board with a multi stage timer 38 which can control the main inflow electric cut off valve and an added 3-way electric valve. The 3-way valve is located after the regulator before entering the wall line. In the case of the poultry house being so large that the wall line becomes too long to operate correctly (when the number of emitters gets too great such that water pressure and volume is decreased or lost) the wall line may be split into halves at the control board. This split will take place at the 3-way valve and will be timed so that only one half will run at any time.

It is understood that virtually all poultry houses have concrete foundations. These foundations average 16" to 24" in height. This is the place the wall line 30 will be mounted in most applications (FIG. 4a). In one embodiment, however, a wall mounting member 60 is selectively coupled to a wall 8, the wall mounting member 60 defining a plurality of vertically spaced apart channels 62. Each channel 62 is configured to receive a respective first portion 52 of a mounting bracket 50 (FIG. 4b) and may be used to allow for vertical height adjustments relative to the wall line.

Figure 4C:
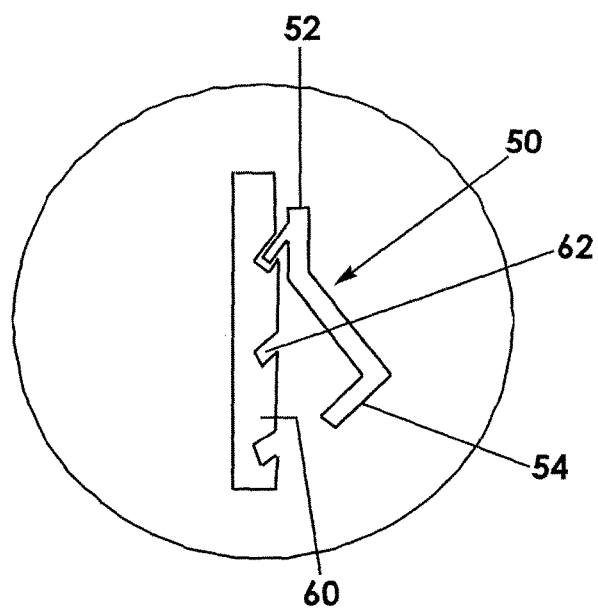
FIG. 4c is an isolated view on an enlarged scale taken from FIG. 4b.
Figure 4D:
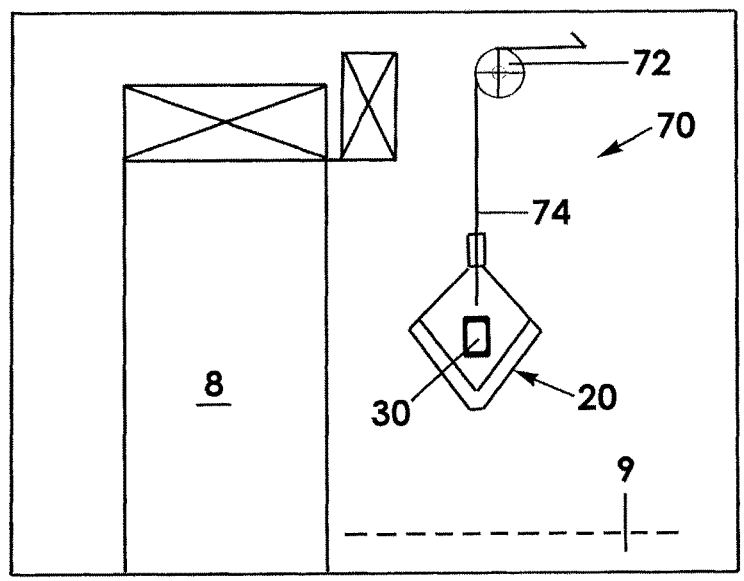
FIG. 4d is a side view of an alternative embodiment of a chemical delivery system illustrated in use with a pulley assembly.

In still another embodiment, a pulley assembly 70 is included so as to suspend the outer shell 20 and drip line 30 from an upper/elevated frame structure such as a rafter, ceiling, or the like (FIG. 4c). The pulley assembly 70 includes at least one pulley wheel 72 rotatably coupled to the frame structure and a pulley cable 74 coupled to the outer shell 20. More particularly, the pulley cable 74 may have a terminal end coupled to the outer shell 20 such that the outer shell 20 is selectively suspended from the elevated structure and is selectively height adjustable by operation of the pulley wheel 74. It is also possible some installations may require a suspended wall line (FIG. 4c) by cable, ropes, or pulleys.

In use, the outer shell 20 and drip line 30 may be mounted to a wall 8 adjacent a perimeter of a poultry house litter bed 9. In one embodiment, the mounting bracket 50 may be configured for height adjustment relative to the poultry house foundation. It is understood that darkling beetles are naturally drawn to walls which they climb in order to lay eggs, such as in areas having insulation or just in wall areas where they are protected. When actuated, water and a beetle-control chemical drip or trickle from the wall line 30 at a predetermined or manually regulated rate or pressure. The chemical solution is guided by the outer shell 20 to run down the wall 8 to which the outer shell is mounted or directly onto the perimeter of the litter bed 9. In this manner, beetles on the move up the wall 8 or that are drawn to the moist environment below the apparatus will come into contact with the chemical and be neutralized and eliminated. It is understood that additional additive may be added to the chemical that lure beetles even more effectively. In addition, a rodent repellant may also be added to the chemical being continuously delivered to the litter bed 9.

Accordingly, beetle populations are controlled by the continuous and controlled delivery of a chemical solution to perimeter areas of a poultry litter bed.

It is understood that while certain forms of this invention have been illustrated and described, it is not limited thereto except insofar as such limitations are included in the following claims and allowable functional equivalents thereof.

The invention claimed is:

1. A chemical delivery system for use in controlling a beetle population in a poultry house having an upstanding wall and a litter bed adjacent the upstanding wall, comprising:
   an elongate outer shell including:
      an upper edge bearing against the upstanding wall of the poultry house;
      a lower edge opposed from said upper edge and displaced from the upstanding wall of the poultry house so as to form an elongate outlet channel;
      a side wall extending between said upper edge and said lower edge, said side wall having at least a portion extending away from the upstanding wall so as to define an interior area; and
   a tubular water line having a elongate configuration situated in said interior area of said outer shell and extending longitudinally adjacent said side wall, said water line defining a plurality of spaced apart holes configured to allow water flowing through said water line to flow out through respective holes and through said outlet channel.

2. The chemical delivery system as in claim 1, comprising a mounting bracket having a first portion selectively coupled to the upstanding wall of the poultry house and having a second portion having a configuration that is substantially congruent to a configuration of said outer shell so as to support said outer shell in relation to the upstanding wall.

3. The chemical delivery system as in claim 1, comprising a plurality of mounting brackets spaced apart along said outer shell, each mounting bracket having a first portion selectively coupled to the upstanding wall of the poultry house and having a second portion operatively coupled to the outer shell so as to support said outer shell in relation to the upstanding wall.

4. The chemical delivery system as in claim 1, wherein said water line is a drip line and said plurality of holes are spaced apart such that a slow and steady amount of water is allowed to fall through said outlet channel onto the litter bed in the poultry house.

5. The chemical delivery system as in claim 3, comprising a wall mounting member having a plurality of vertically spaced apart channels, each channel being configured to receive a respective first portion of a respective mounting bracket such that a height of said respective mounting bracket is vertically selectable.

6. The chemical delivery system as in claim 2, comprising a wall mounting member having a plurality of vertically spaced apart channels, each channel being configured to receive said first portion of said mounting bracket such that a height of said mounting bracket is vertically selectable.

7. The chemical delivery system as in claim 3, wherein said second portion of said respective mounting bracket is positioned adjacent a lower section of said side wall of said outer shell so as to support the weight of said outer shell relative to the upstanding wall.

8. The chemical delivery system as in claim 2, wherein said second portion of said mounting bracket is positioned adjacent a lower section of said side wall of said outer shell so as to support the weight of said outer shell relative to the upstanding wall.

9. The chemical delivery system as in claim 2, wherein:
said side wall of said outer shell includes a generally inverted L-shaped configuration; and
said second portion of said mounting bracket includes a generally L-shaped configuration, said second portion of said mounting bracket being positioned so as to support the weight of said outer shell.

10. The chemical delivery system as in claim 2, wherein:
said side wall of said outer shell includes a generally circular shaped configuration; and
said second portion of said mounting bracket includes a generally inverted C-shaped configuration, said second portion of said mounting bracket being positioned so as to support the weight of said outer shell.

11. The chemical delivery system as in claim 2, wherein:
said side wall of said outer shell includes a generally rectangular configuration; and
said second portion of said mounting bracket includes a generally inverted truncated box-shaped configuration, said second portion of said mounting bracket being positioned so as to support the weight of said outer shell.

12. The chemical delivery system as in claim 1, comprising a pulley assembly having a pulley wheel rotatably mounted to an elevated structure of the poultry house and a pulley cable operatively coupled to said pulley wheel, said pulley cable having a terminal end coupled to said outer shell such that said outer shell is selectively suspended from the elevated structure.

13. The chemical delivery system as in claim 8, comprising a pulley assembly having a pulley wheel rotatably mounted to an elevated structure of the poultry house and a pulley cable operatively coupled to said pulley wheel, said pulley cable having a terminal end coupled to said outer shell such that said outer shell is selectively suspended from the elevated structure.

14. The chemical delivery system as in claim 1, comprising:
an injector coupled to said water line configured to insert a chemical into said water line; and
a timing device operatively connected to said water line and configured to regulate the flow of water through said injector.

15. The chemical delivery system as in claim 8, comprising:
an injector coupled to said water line configured to insert a chemical into said water line; and
a timing device operatively connected to said water line and configured to regulate the flow of water through said injector.

* * * * *